M. PETTERSON.
AIR CUSHION DEVICE.
APPLICATION FILED JAN. 3, 1920.
1,359,838.
Patented Nov. 23, 1920.
2 SHEETS—SHEET 1.
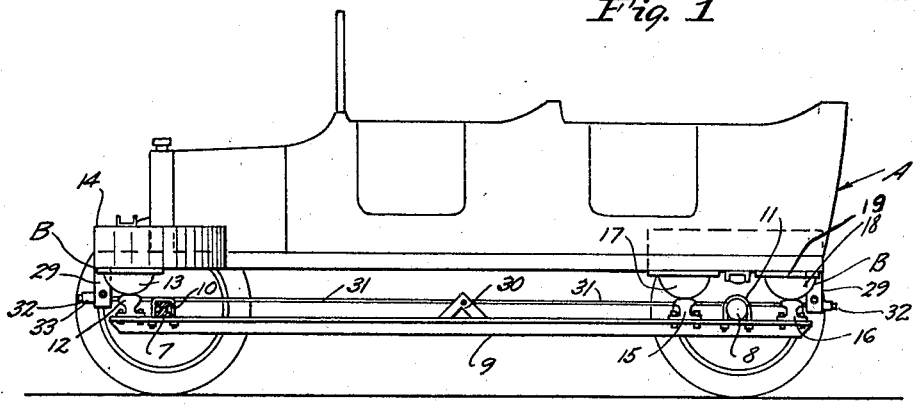
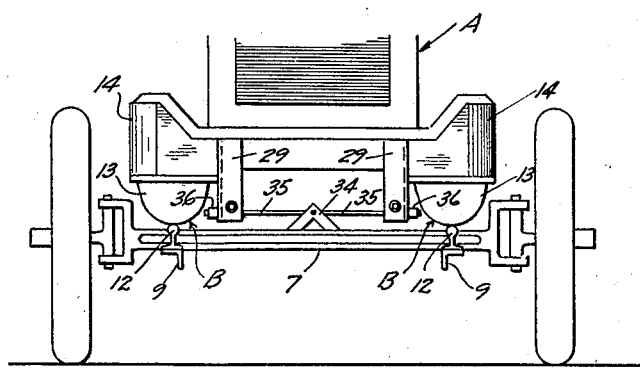
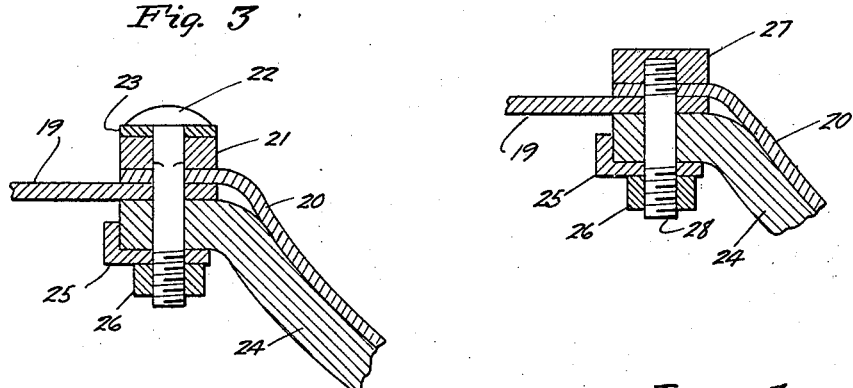
Inventor
Magnus Petterson
by Nextall and Wallace
his Attorneys M. PETTERSON.
AIR CUSHION DEVICE.
APPLICATION FILED JAN. 3, 1920.
1,359,838.
Patented Nov. 23, 1920.
2 SHEETS—SHEET 2.
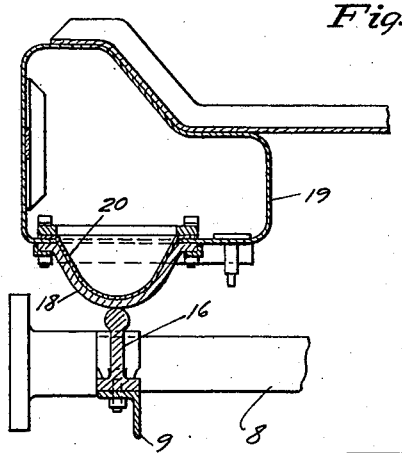
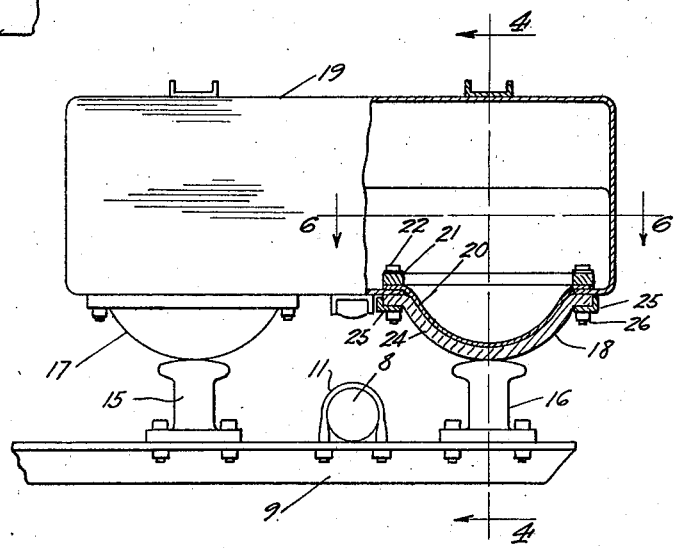
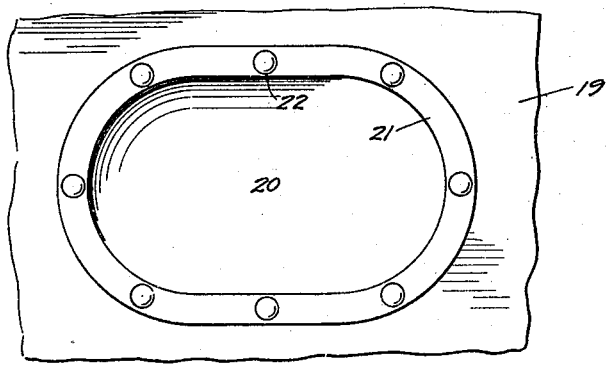
Inventor
Magnus Petterson
by Westall and Wallace
his Attorneys

UNITED STATES PATENT OFFICE.

MAGNUS PETTERSON, OF LONG BEACH, CALIFORNIA.

AIR-CUSHION DEVICE.

1,359,838. Specification of Letters Patent. Patented Nov. 23, 1920.

Application filed January 3, 1920. Serial No. 349,187.

*To all whom it may concern:*

Be it known that I, MAGNUS PETTERSON, a citizen of the United States, residing at Long Beach, in the county of Los Angeles and State of California, have invented new and useful Improvements in Air-Cushion Devices, of which the following is a specification.

This invention relates to a resilient air cushion adapted for use in supporting the body of a vehicle upon the axles and for replacing the ordinary metallic springs.

As illustrated herein, the device is applied to an automobile and is interposed between the axles and chassis. Metallic springs are objectionable in that they produce a rebound or recoil in recovering their normal position, which rebound causes shocks. For this reason, it is common practice to equip automobiles with shock absorbers to lessen the recoil or rebound. It is an object of my invention to provide an air cushion which will absorb all vibration and will not cause a shock. It is another object of this invention to provide an air cushion of the type described which will support any device subject to vibration shocks, which is easily assembled and disassembled, and will not leak air.

These objects will be more fully understood, as will also other objects and corresponding accomplishments of my invention, from the following detailed description of a preferred embodiment thereof. For the purpose of this description, reference is had to the accompanying drawing, in which:

Figure 1 is a side elevation of an automobile equipped with my air springs; Fig. 2 is an enlarged front elevation of the automobile shown in Fig. 1; Fig. 3 is a fragmentary section of the absorber showing the details of the means for attaching it to the air tank; Fig. 3ª is a modified form of attaching the absorber to the air tank; Fig. 4 is a section as seen on the line 4—4 of Fig. 5; Fig. 5 is an enlarged side elevation of the air spring adjacent the rear axle, a part being shown in section; and Fig. 6 is a plan view as seen on the line 6—6 of Fig. 5.

Referring more particularly to Fig. 1, an automobile body A is supported upon the axles by means of air springs indicated generally by B. As shown there are two air springs adjacent the rear axle on one side, and a single air spring adjacent the front axle on one side. This construction is duplicated upon the other side of the vehicle. However, I do not limit myself to this exact distribution of air springs.

Referring more specifically to the drawing, 7 indicates the front axle of the automobile and 8 the rear axle. Extending longitudinally of the automobile on both sides thereof and beneath the axles are angle bars 9. Each angle bar is secured to the front axle by a strap bolt 10 and to the rear axle by a strap bolt 11. Mounted upon the angle bars 9 forward of the front axle are deformers of mushroom shape indicated by 12. The deformers have rounded oval heads. Resting upon the deformers are absorbers 13 connected to tanks 14 disposed at the sides of the automobile frame. On each angle bar to the front and rear of the axle 8 are mounted deformers 15 and 16 of the same shape as deformer 12. Resting upon deformers 15 and 16 are absorbers 17 and 18 connected to a single air tank 19, there being a tank on each side of the automobile for each pair of rear air springs.

The tanks may be of any shape suitable to the automobile and are preferably formed of metal with the flat sides braced by angle bars, I bars, channels, or the like to prevent bulging. In Figs. 4 and 5 such braces are shown. Oval openings are formed in the bottoms of the tanks and overlapping the edges of the opening are lining elements of elastic material such as rubber, which are indicated by 20.

Referring to the preferred form of clamping the absorber to the tank as shown in Fig. 3, a clamp ring 21 having bolt holes for registration with the bolt holes in the tank is placed over the absorber member 20 at the edge of the opening. Bolts 22 are placed in the registering bolt holes with resilient washers 23 placed between the clamp rings and the bolt heads so as to prevent leakage of air along the bolt shanks. The absorber casing 24, which may be of the same fabric as a tire casing, is then placed on the outside of the tank with the edge thereof overlapping the edge of the opening. The casing is provided with openings for the bolts 22. A retaining ring of angle form, indicated by 25, and having bolt openings is placed over the lapped edge of the casing, there being sufficient clearance between the vertical leg of the angle and the tank to permit compression of the casing so as to provide a tight fit. Nuts 26 are then placed over the retaining ring and upon the bolt and the whole tightened, thereby providing a non-leak connection. The air entrapped in the tank by its elasticity provides a cushion, and to provide for charging the tanks air valves may be used.

With the construction shown in Fig. 3ª, a clamp ring 27 having threaded recesses which do not extend through the ring is substituted for the bolt and clamp ring shown in Fig. 3. A threaded screw 28 is engaged with the threads in ring 27, and nut 26 placed upon the screw in the same manner as the construction shown in Fig. 3. This provides a non-leak joint between the absorber lining member 20 and the tank.

To assemble the tank and absorber elements of the type shown in Fig. 3, the absorber lining 20 is placed in position with the oval ring 21 resting thereon and the bolts extending therethrough. The oval clamp ring can be easily inserted and removed through the oval opening in the manner of a manhole cover for boilers. The casing is then placed in position with the retaining ring over the casing and the nuts placed in position on the bolts. The manner of disassembling the structure is the reverse of assembling it.

It will be noted that the absorber lining does not extend farther than to overlap the edge of the opening in the tank, it being open and in communication with the interior of the tank. The mushroom shaped deformers permit the absorbers to bend over the sides thereof without cramping the absorber lining. This avoids chafing and early destruction of the absorber lining.

In order to stabilize the body of the car, angle pieces 29 are secured to the corners of the frame and extend therefrom. Referring to Fig. 1, a standard 30 is secured to the middle of the angle bar 9, and tie rods 31 are pivotally secured thereto. The other ends of the tie rods are mounted in the angle pieces 29, slidably extending therethrough. Adjustably mounted upon the tie rods are nuts 32 and interposed between them and the angle pieces are resilient buffer washers 33. This construction permits an up and down movement of the body with respect to the axles, but prevents forward or backward movement. This construction is duplicated on the other side of the automobile.

Referring to Fig. 2, a similar stabilizer is shown to prevent side movement. A standard 34 is mounted upon the front axle, and tie rods 35 are secured thereto. These slidably extend through the angle pieces 29 and have buffer washers 36 thereon. To complete the stabilized construction, a similar set of tie rods may be mounted between the frame and rear axle. It is obvious that the stabilizer firmly secures the body to the axles against side, front, and rear movement, but permits up and down movement and operation of the air springs.

What I claim is:

1. An air cushion comprising a rigid reservoir for air having an oval opening therein, an elastic absorber member having an edge overlapping the inner edge of said opening, an oval clamp ring resting on the overlapped edge of said absorber member, an absorber casing overlapping the outside edge of said opening, and means extending through said overlapped edges and ring to secure them together.

2. An air cushion comprising a rigid reservoir for air having an oval opening therein, an elastic absorber member having an edge overlapping the inner edge of said opening, an oval clamp ring resting on the overlapped edge of said absorber member, an absorber casing overlapping the outside edge of said opening, an oval retaining ring overlying the overlapped edge of said casing, and bolts extending through said overlapped edges, clamp and retaining rings to secure them together.

3. An air cushion comprising a rigid reservoir for air having an oval opening therein, an elastic absorber member having an edge overlapping the inner edge of said opening, an oval clamp ring resting on the overlapped edge of said absorber member, an absorber casing overlapping the outside edge of said opening, means extending through said overlapped edges and clamp ring to secure them together, and an oval deformer in contact with said absorber.

4. An air cushion comprising a rigid reservoir for air having an oval opening therein, an elastic absorber member having an edge overlapping the inner edge of said opening, an oval clamp ring resting on the overlapped edge of said absorber member, an absorber casing overlapping the outside edge of said opening, an oval retaining ring overlying the overlapped portion of said casing, bolts extending through said overlapped edges, clamp ring, and retaining ring to secure them together, and an oval deformer in contact with said absorber.

5. An air cushion comprising a rigid reservoir for air having an oval opening therein, an elastic absorber member having an edge overlapping the inner edge of said opening, an oval clamp ring resting on the overlapped edge of said absorber member, an absorber casing overlapping the outside edge of said opening, means extending through said overlapped edges and clamp ring to secure them together, and an oval mushroom deformer in contact with said absorber.

6. An air cushion comprising a rigid reservoir for air having an oval opening therein, an elastic absorber member having an edge overlapping the inner edge of said opening, an oval clamp ring resting on the overlapped edge of said absorber member, an absorber casing overlapping the outside edge of said opening, an oval retaining ring overlying the overlapped portion of said casing, bolts extending through said overlapped edges, clamp ring, and retaining ring to secure them together, and an oval mushroom deformer in contact with said absorber.

In witness that I claim the foregoing I have hereunto subscribed my name this 24th day of December, 1919.

MAGNUS PETTERSON.